US009557564B2

(12) United States Patent
Kodani et al.

(10) Patent No.: US 9,557,564 B2
(45) Date of Patent: Jan. 31, 2017

(54) ROTARY BODY DRIVING APPARATUS

(71) Applicant: Shinano Kenshi Kabushiki Kaisha, Ueda-shi, Nagano (JP)

(72) Inventors: Masayuki Kodani, Ueda (JP); Nobuchika Maruyama, Ueda (JP)

(73) Assignee: SHINANO KENSHI KABUSHIKI KAISHA, Ueda-Shi, Nagano (JP)

( * ) Notice: Subject to any disclaimer, the term of this patent is extended or adjusted under 35 U.S.C. 154(b) by 0 days.

(21) Appl. No.: 14/753,874

(22) Filed: Jun. 29, 2015

(65) Prior Publication Data
US 2015/0378153 A1    Dec. 31, 2015

(30) Foreign Application Priority Data

Jun. 30, 2014  (JP) .................................. 2014-133533

(51) Int. Cl.
| G02B 26/08 | (2006.01) |
| G02B 26/12 | (2006.01) |
| G02B 26/10 | (2006.01) |
| H02K 7/00 | (2006.01) |
| H02K 29/08 | (2006.01) |
| G02B 7/182 | (2006.01) |

(Continued)

(52) U.S. Cl.
CPC ........... *G02B 26/127* (2013.01); *G02B 7/1821* (2013.01); *G02B 26/105* (2013.01); *G02B 26/121* (2013.01); *H02K 7/003* (2013.01); *H02K 11/00* (2013.01); *H02K 29/08* (2013.01); *G02B 5/09* (2013.01)

(58) Field of Classification Search
CPC ..... G02B 26/12; G02B 26/127; G02B 21/121; G02B 26/105; G02B 7/1821; G02B 5/09; H02K 7/003; H02K 7/083; H02K 7/09; H02K 7/14; H02K 7/086

USPC ................... 359/216.1–218.1, 200.1; 310/91
See application file for complete search history.

(56) References Cited

U.S. PATENT DOCUMENTS 6,087,749 A  *  7/2000  Ishizuka .............. G02B 26/121
                                                                310/91
2010/0050702 A1     3/2010  Kim et al.

FOREIGN PATENT DOCUMENTS

| JP | U61-88480 A | 6/1986 |
| JP | H11 305161 | 11/1999 |

(Continued)

OTHER PUBLICATIONS

Extended European Search Report dated Mar. 8, 2016 in corresponding European Patent Application No. 15170215.6.

(Continued)

*Primary Examiner* — Euncha Cherry
(74) *Attorney, Agent, or Firm* — Stephen J. Weyer, Esq.; Stites & Harbison, PLLC

(57) ABSTRACT

The rotary body driving apparatus for rotating a rotary body comprises: a rotor shaft, to which the rotary body and a rotor are attached, being rotatably held by a bearing section; a rotor magnet being attached to the rotor and partially exposed as a position detecting magnet; a first positioning section being formed in the rotor, the first positioning section corresponding to the position detecting magnet; and a second positioning section corresponding to a reference surface of the rotary body. The rotary body is attached to the rotor in a state where the first positioning section and the second positioning section are aligned so as to make circumferential positions of the reference surface and the position detecting magnet correspond to each other.

3 Claims, 3 Drawing Sheets

(51) Int. Cl.
*H02K 11/00* (2016.01)
*G02B 5/09* (2006.01)

(56) References Cited

FOREIGN PATENT DOCUMENTS

| | | |
|---|---|---|
| JP | 2000321520 | 11/2000 |
| JP | 2002 244067 | 8/2002 |
| JP | A-2003050371 | 2/2003 |
| JP | 2006259446 | 9/2006 |

OTHER PUBLICATIONS

Japanese Office Action dated Mar. 22, 2016 in corresponding Japanese Patent Application No. 2014-133533.
Japanese Office Action dated Oct. 18, 2016 in corresponding Japanese Patent Application No. 2014-133533.

* cited by examiner

ROTARY BODY DRIVING APPARATUS

CROSS-REFERENCE TO RELATED APPLICATION

This application is based upon and claims the benefit of priority of the prior Japanese Patent Application No. 2014-133533, filed on Jun. 30, 2014, and the entire contents of which are incorporated herein by reference.

FIELD

The present invention relates to a rotary body driving apparatus, in which a rotary body, e.g., tilt mirror, polygon mirror, is attached to a rotor shaft together with the rotor.

BACKGROUND

In case of an outer rotor, a cup-shaped rotor yoke is attached to one end part of a rotor shaft, and the rotor shaft is rotatably held by a stator housing. A circular rotor magnet is provided inside of the rotor yoke, and the rotor magnet is set to face pole teeth of a stator core assembled in the stator housing.

To detect rotational positions of the rotor, a position detecting magnet, which is separated from the rotor magnet, is provided to a part of an outer periphery of the rotor yoke. A position of a magnetic pole of the position detecting magnet is detected by a magnetic pole detecting sensor, e.g., Hall element, which is provided on a motor substrate, so that the rotational position of the rotor can be detected (see Patent Document 1).

PRIOR ART DOCUMENT

Patent Document 1: Japanese Laid-open Utility Model Publication No. 61-88480

SUMMARY

However, in case that the rotor magnet and the position detecting magnet are used as disclosed in Patent Document 1, number of parts must be increased, number of production steps must be increased and a production cost must be increased.

In case that a load member is the rotary body having a plurality of surfaces, there is need of detecting a reference surface of rotation.

Further, to obtain rotational positions of the rotary body and improve controllability, there is need of aligning a rotational reference position of the rotor with a reference surface of the rotary body when assembling the both.

The present invention has been invented to solve the above described problems of the conventional technology.

Accordingly, an object of the present invention is to provide a rotary body driving apparatus, which is capable of reducing a production cost by reducing number of parts, improving assemblability by correctly aligning a rotational reference position of a rotary body becoming a load with that of a rotor and improving rotational controllability.

To achieve the object, the present invention has following structures.

Namely, the rotary body driving apparatus for rotating a rotary body having a plurality of surfaces, comprises:

a rotor;

a rotor shaft, to one end part of which the rotary body is attached together with the rotor, being rotatably held by a bearing section of a stator housing;

a rotor magnet being attached to the rotor, the rotor magnet being exposed to an outer circumferential side, by partially cutting an outer circumferential wall of the rotor, as a position detecting magnet;

a first positioning section being formed in the rotor, the first positioning section corresponding to the position detecting magnet; and a second positioning section corresponding to a reference surface of the rotary body, and the rotary body is attached to the rotor in a state where the first positioning section and the second positioning section are aligned so as to make circumferential positions of the reference surface and the position detecting magnet correspond to each other.

With the above described structure, the position detecting magnet is formed by partially cutting the outer circumferential wall of the rotor to outwardly expose a part of the rotor magnet, so that number of parts can be reduced and a production cost of the apparatus can be reduced. The first positioning section is formed to correspond to the position detecting magnet of the rotor, the second positioning section is formed to correspond to the reference surface of the rotary body, and the rotary body is attached to the rotor in the state where the first positioning section and the second positioning section are aligned so as to make circumferential positions of the reference surface and the position detecting magnet correspond to each other, so that the position detecting magnet and the reference surface can be finally circumferentially aligned for assembling the rotary body and the rotor.

Therefore, the rotary body becoming the load and the rotor can be assembled in the state where the rotational reference positions of the both are correctly aligned with each other, so that the rotary body driving apparatus, which has high assemblability and high rotational controllability, can be provided.

Preferably, the first positioning section and the second positioning section are recession/projection-fitted to each other so as to prohibit the rotary body from rotating with respect to rotor.

With this structure, assembling the rotary body and the rotor can be easily performed. Note that, the projection acting as the first positioning section and the recession acting as the second positioning section may be optionally formed in the rotary body and the rotor.

In the rotary body driving apparatus, the rotor may include:

a rotor hub being integrally attached to the rotor shaft;

a circular rotor yoke being integrally attached to the rotor hub; and the rotor magnet being formed into a circular shape and provided on an inner circumferential surface of the rotor yoke, and the first positioning section may be provided to the rotor hub and may correspond to the position detecting magnet, and the second positioning section may be formed in a mounting surface of the rotary body and may correspond to the first positioning section.

With this structure, when mounting the rotary body onto the rotor hub, the rotary body and the position detecting magnet can be correctly positioned only by aligning the first and second positioning sections with each other.

In the rotary body driving apparatus, the rotary body may be a tilt mirror having a plurality of inclined reflective surfaces or a polygon mirror having a plurality of reflective surfaces, and the rotary body may be attached to the one end part of the rotor shaft and prohibited from detaching from and rotating with respect to the rotor so as to make a reference reflective surface correspond to the position of the position detecting magnet.

With this structure, the mirror and the rotor can be assembled in the state where the reference reflective surface of the mirror and the position detecting magnet are aligned with each other.

By the present invention, the rotary body driving apparatus, which is capable of reducing the production cost by reducing number of parts, improving assemblability by correctly aligning the rotational reference position of the rotary body becoming the load with that of the rotor and increasing rotational controllability, can be provided.

BRIEF DESCRIPTION OF THE DRAWINGS

Embodiments of the present invention will now be described by way of examples and with reference to the accompanying drawings which are given by way of illustration only, and thus are not limitative of the present invention, and in which.

DESCRIPTION OF THE EMBODIMENTS

Preferred embodiments of an optical scanner, which is an example of a rotary body driving apparatus relating to the present invention, will now be described in detail with reference to the accompanying drawings. Firstly, the optical scanner, which reflects and irradiates a laser beam emitted from a laser irradiation unit in a wide range, will be explained.

Figure 1:
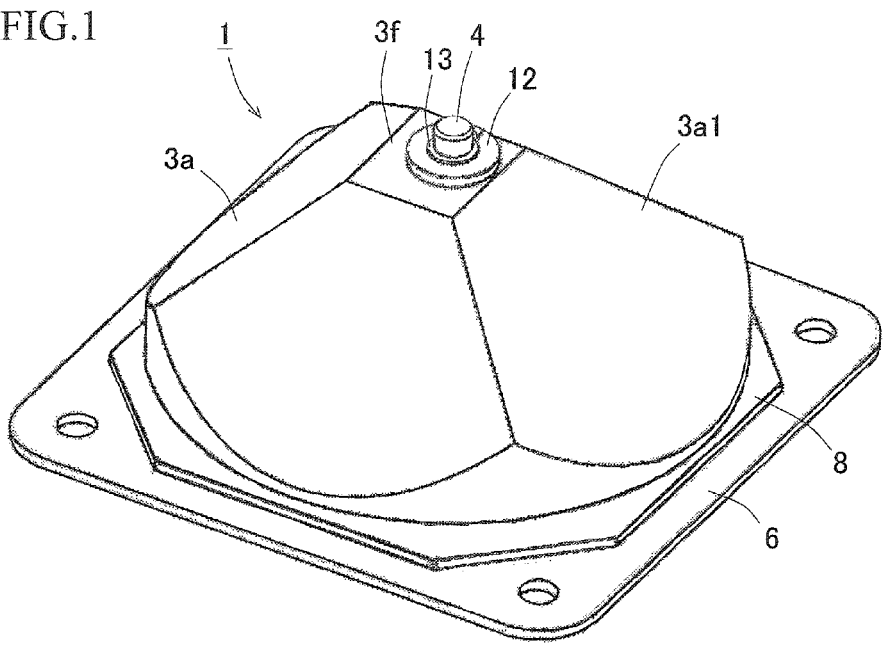
FIG. 1 is an axial sectional view of an optical scanner.
Figure 2:
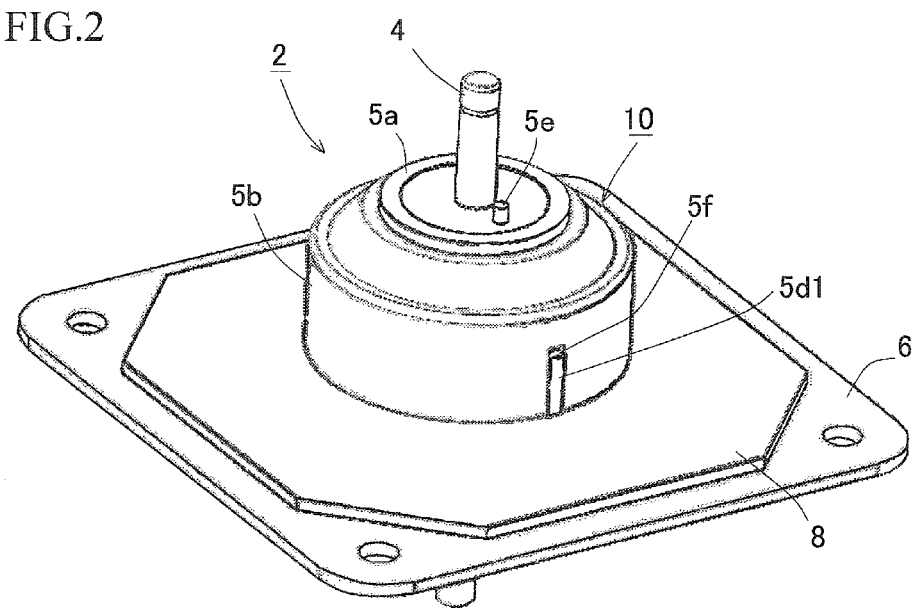
FIG. 2 is a perspective view of the optical scanner shown in FIG. 1, in which a tilt mirror is detached.

As shown in FIGS. 1 and 2, in the optical scanner 1, a tilt mirror 3 having, for example, four reflective surfaces 3a, whose inclination angles are different from each other, is attached to one end part of a rotor shaft 4 of a motor 2 (see FIG. 2) together with a rotor yoke 5. The tilt mirror 3 and the rotor yoke 5 are prohibited from detaching from and rotating with respect to the rotor shaft 4.

Figure 4:
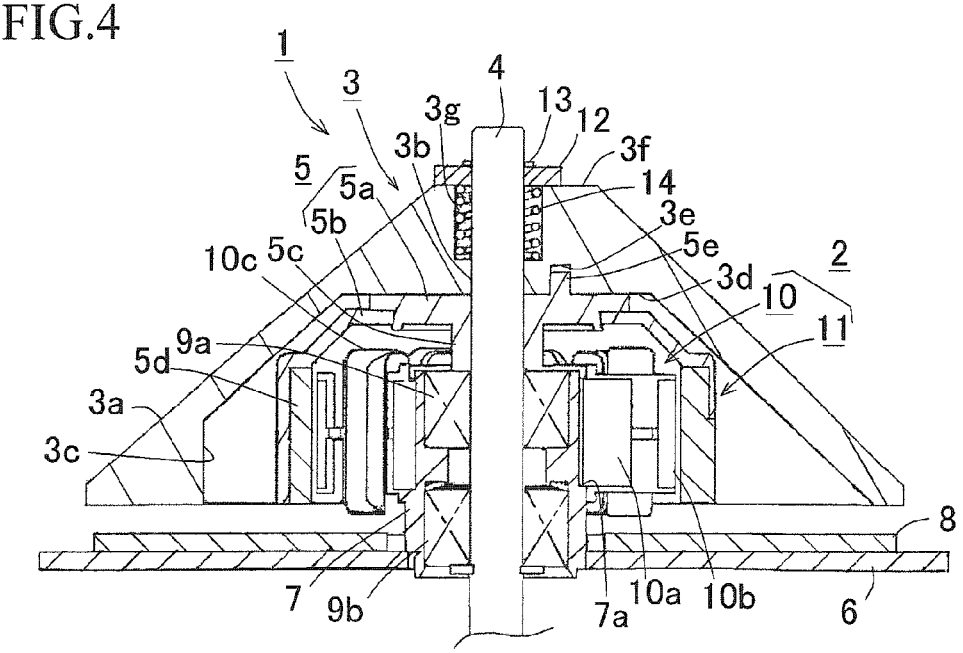
FIG. 4 is an axial sectional view of the optical scanner shown in FIG. 1.

Firstly, a structure of the motor 2 will be explained. As shown in FIG. 4, a bearing housing 7 (stator housing) is integrally attached to a base plate 6. A substrate 8, on which Hall elements for detecting magnetic poles of a rotor magnet 5d, etc. are mounted, is attached on the base plate 6.

In FIG. 4, a first bearing section 9a and a second bearing section 9b are attached in the bearing housing 7 which is formed into a cylindrical shape. For example, the first bearing section 9a and the second bearing section 9b are rolling bearings. A step-shaped part 7a is formed in an outer circumferential surface of the bearing housing 7. A stator 10 is attached to the step-shaped part 7a. In the stator 10, a stator core 10a is covered with insulators and motor coils 10c are respectively wound on magnetic pole teeth 10b. The stator core 10a is fixed to the bearing housing 7 by press fit and adhesive.

The rotor shaft 4 of a rotor 11 is rotatably held by the first bearing section 9a and the second bearing section 9b provided in the bearing housing 7. In the rotor yoke 5, a rotor hub 5a and a circular yoke part 5b are integrated with each other by caulking. A sleeve 5c is extended from a center part of the rotor hub 5a toward the yoke part 5b side. The shaft 4 is integrally fitted into the hole of the sleeve 5c by press fit, shrink fit, adhesive, etc. In the rotor hub 5a, a projection (first positioning section) 5e is provided on one axial side opposite to the sleeve 5c side. A plurality of the projections 5e may be formed. The rotor magnet 5d is integrally attached on an inner circumferential surface of the yoke part 5b. In the rotor magnet 5d, N-poles and S-poles are alternately formed and faced to the pole teeth 10b of the stator 10.

As shown in FIG. 2, a notched part 5f is formed in a part of the rotor yoke 5b. A part of the rotor magnet 5d, which is exposed in the notched part 5f, is used as a position detecting magnet 5d1. A circumferential position of the position detecting magnet 5d1 provided to the rotor yoke 5b and that of the projection 5e of the rotor hub 5a are corresponded to each other.

The tilt mirror 3 is integrated with the rotor 11. As shown in FIG. 1, the tilt mirror 3 is formed into a multiple truncated pyramid shape and has a plurality of the reflective surfaces (e.g., four reflective surfaces) 3a whose inclination angles are different from each other. A shaft hole (through-hole) 3b, through which the rotor shaft 4 can be inserted, is formed at a center part of the tilt mirror 3. The reflective surfaces 3a are mirror surfaces, which are formed by vapor-depositing metal on a material of the tilt mirror 3, e.g., metallic material, resin material, or polishing the same. In the tilt mirror 3, a recessed part 3c for accommodating the rotor yoke 5 is formed in a surface facing to the motor 2. A fitting hole (second positioning section) 3e is formed in an inner bottom part 3d of the recessed part 3c. The fitting hole 3e is formed to correspond to a reference reflective surface 3a1 of the reflective surfaces 3a of the tilt mirror 3. The projection 5e of the rotor hub 5a can be fitted into the fitting hole 3e.

Figure 3:
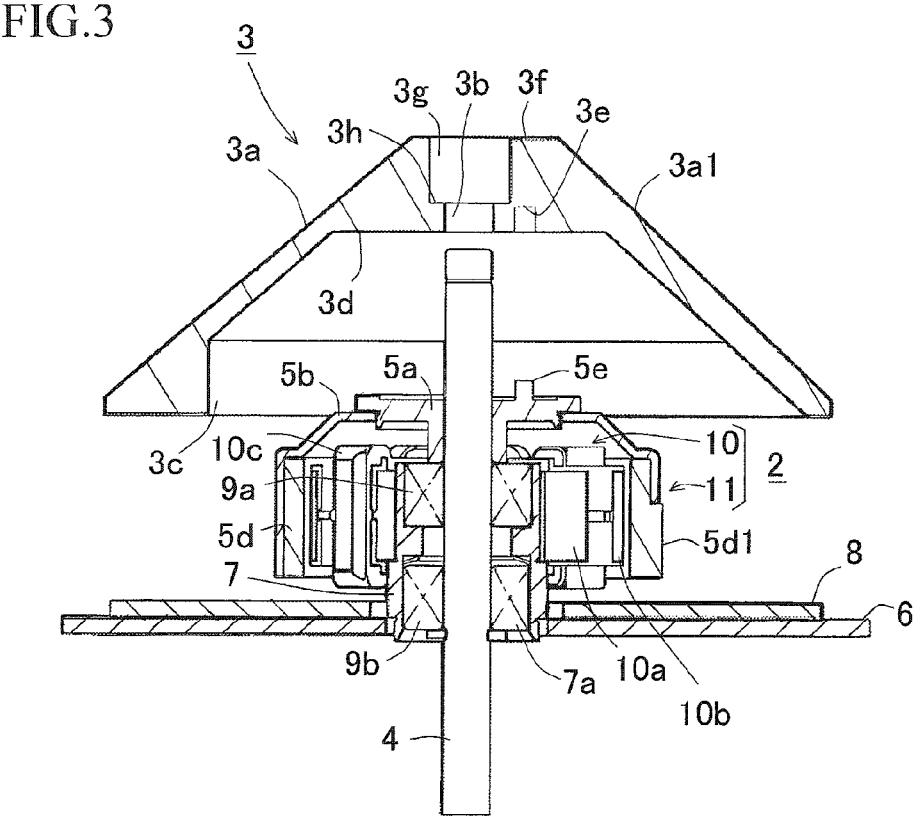
FIG. 3 is an axial sectional view of the optical scanner shown in FIG. 1, in which the tilt mirror is detached from a rotor shaft.

As shown in FIG. 3, the motor 2 is assembled by attaching the stator 10 to the bearing housing 7 and inserting the rotor shaft 4 into the bearing housing 7 for rotatably holding the rotor 11. The circumferential position of the projection 5e of the rotor 11 is aligned with that of the position detecting magnet 5d1. Next, the tilt mirror 3 is assembled by inserting the rotor shaft 4 into the shaft hole 3b and setting the inner bottom part 3d on the rotor hub 5a, the rotor yoke 5 is accommodated in the recessed part 3c, and the projection 5e, which has been corresponded to the position detecting magnet 5d1, is fitted into the fitting hole 3e, which corresponds to the reference reflective surface 3a1.

As shown in FIG. 1, a chamfered part 3f is formed in a top part of the tilt mirror 3, and a recessed part 3g, through which the rotor shaft 4 is penetrated, is formed in the chamfered part 3f (see FIG. 4). A retaining washer (retainer section) 12 is attached to a position immediately above the recessed part 3g, through which the rotor shaft 4 is penetrated, with forming a space from the chamfered part 3f. An axial position of the retaining washer 12 is fixed by a snap ring 13, e.g., e-ring, provided to the rotor shaft 4.

Figure 5:
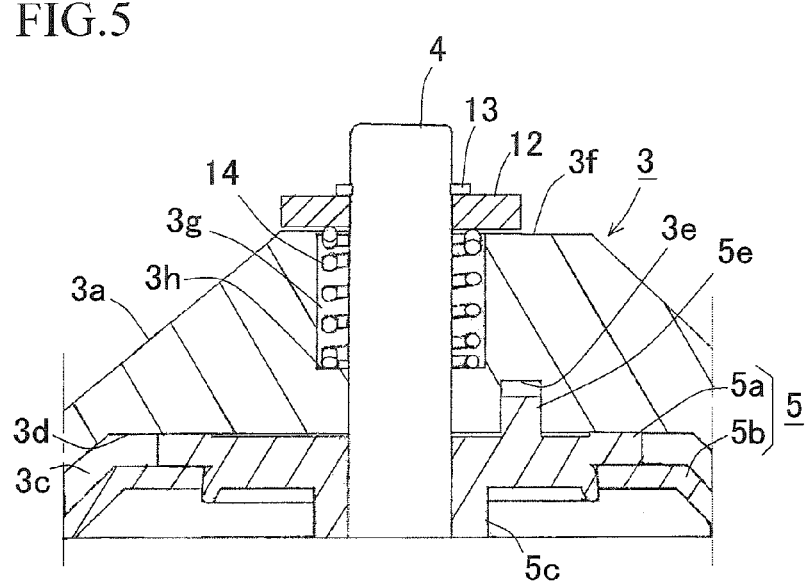
FIG. 5 is a partially enlarged sectional view of FIG. 4.

In FIGS. 4 and 5, a compressed coil spring (elastic member) 14 is provided between an inner bottom part 3h of the recessed part 3g and the retaining washer 12. An elastic force of the coil spring 14 always biases the tilt mirror 3 toward the rotor yoke 5, so that axial detachment of the tilt mirror 3 can be prevented. Further, as shown in FIG. 5, by fitting the projection 5e into the fitting hole 3e, the tilt mirror 3 is attached to the rotor 10 and prohibited from rotating with respect to the rotor 10. The space is formed between the retaining washer 12 and the chamfered part 3f, and another space is formed between a front end of the projection 5e and an inner ceiling part of the fitting hole 3e. With this structure, an excessive pressing force applied by the coil spring 14 can be absorbed, and vibration applied from the rotor 11 to the tilt mirror 3 can be easily absorbed by the coil spring 14. Note that, the elastic member provided in the recessed part 3g is not limited to the coil spring 14. Other elastic members, e.g., plate spring, disc spring, rubber, may be employed.

The chamfered part 3f is formed in the top part of the tilt mirror 3. Preferably, the chamfered part 3f should be eliminated, as much as possible, so as to increase reflective areas of the reflective surfaces 3a as far as the retaining washer 12 can be stably attached.

As described above, the projection (first positioning section) 5e, which is formed in the rotor 11 and corresponds to the position detecting magnet 5d1, and the fitting hole (second positioning section) 3e, which is formed to correspond to the reference reflective surface 3a1 described later, are aligned, and the tilt mirror 3 is attached to the rotor 11 in the state where the position detecting magnet 5d1 corresponds to the reference reflective surface 3a1 and the detachment and rotation of the tilt mirror with respect to the rotor 11 are prohibited.

With the above described structure, the rotor magnet 5d is outwardly exposed by partially cutting the outer circumferential wall of the rotor 11, i.e., the rotor yoke 5b, as the position detecting magnet 5d1, so that number of parts can be reduced and a production cost also can be reduced. When attaching the tilt mirror 3 to the rotor 11, the projection (first positioning section) 5e, which is formed in the rotor 11 and corresponds to the position detecting magnet 5d1, and the fitting hole (second positioning section) 3e, which is formed to correspond to the reference reflective surface 3a1, are aligned, so that the position detecting magnet 5d1 and the reference surface 3a1 can be finally circumferentially aligned for attaching the tilt mirror 3. Therefore, the rotary body driving apparatus, which is capable of improving assemblability by correctly aligning the rotational reference position of the tilt mirror 3 becoming the load with that of the rotor 11, can be provided.

Since data of the rotational positions of the tilt mirror 3 are obtained through the rotor 11, controllability of the optical scanner 1 can be improved.

Note that, the projection acting as the first positioning section and the recession acting as the second positioning section may be optionally formed in the rotary body and the rotor.

The rotary body is not limited to the tilt mirror 3 having a plurality of the reflective surfaces 3a. For example, a polygon mirror having a plurality of reflective surfaces may be employed, and the polygon mirror may be attached to the one end part of the rotor shaft together with the rotor in a state where a reference reflective surface corresponds to the position of the position detecting magnet and the polygon mirror is prohibited from detaching from and rotating with respect to the rotor.

In the above described embodiment, the motor is the outer rotor-type motor, but an inner rotor-type motor may be used in the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. A rotary body driving apparatus for rotating a rotary body having a plurality of reflective surfaces whose inclination angles are different from each other, comprising:
   a rotor;
   a rotor shaft, to one end part of which the rotary body is attached together with the rotor, being rotatably held by a bearing section of a stator housing;
   a rotor magnet being attached to the rotor, the rotor magnet being exposed to an outer circumferential side, by partially cutting an outer circumferential wall of the rotor, as a position detecting magnet;
   a first positioning section being formed in the rotor, the first positioning section corresponding to the position detecting magnet; and
   a second positioning section corresponding to a reference reflective surface of the rotary body,
   wherein the rotary body and the rotor are recession/projection-fitted to each other so as to prohibit rotation in a state where the first positioning section and the second positioning section are aligned so as to make circumferential positions of the reference reflective surface and the position detecting magnet correspond to each other.

2. The rotary body driving apparatus according to claim 1, wherein the rotor includes:
   a rotor hub being integrally attached to the rotor shaft;
   a circular rotor yoke being integrally attached to the rotor hub; and
   the rotor magnet being formed into a circular shape and provided on an inner circumferential surface of the rotor yoke, and
   wherein the first positioning section is provided to the rotor hub and corresponds to the position detecting magnet and
   the second positioning section is formed in a mounting surface of the rotary body and corresponds to the first positioning section.

3. The rotary body driving apparatus according to claim 1, wherein the rotary body is a tilt mirror having a plurality of inclined reflective surfaces, and
   the rotary body is attached to the one end part of the rotor shaft and prohibited from detaching from and rotating with respect to the rotor so as to make the reference reflective surface correspond to the position of the position detecting magnet.

* * * * *